Dec. 31, 1963 J. B. DOSTAL 3,116,069
COMBINATION CAR SEAT AND STROLLER
Filed March 19, 1962 2 Sheets-Sheet 1
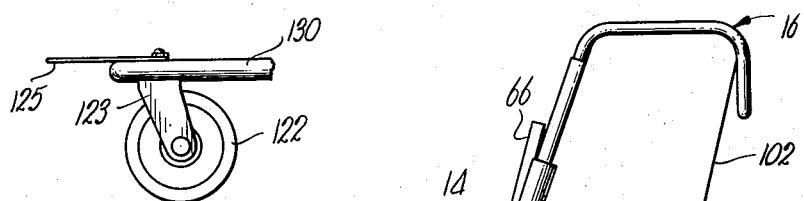
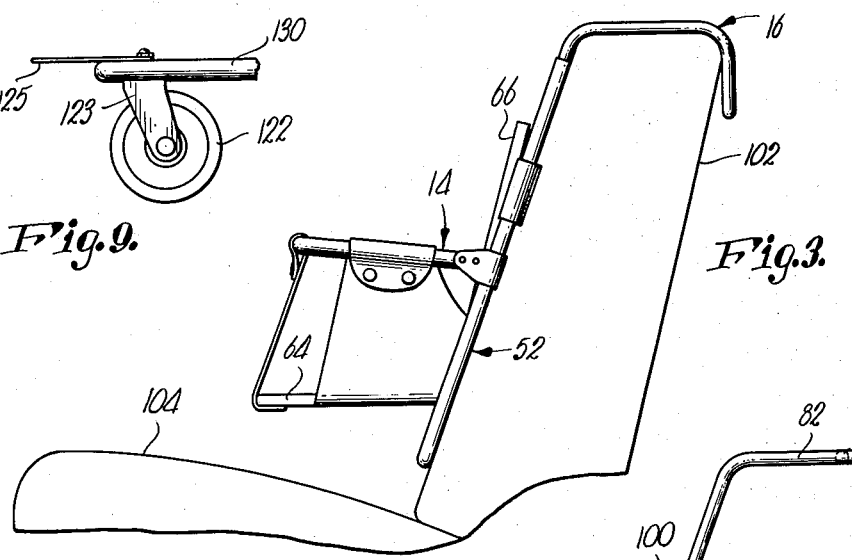
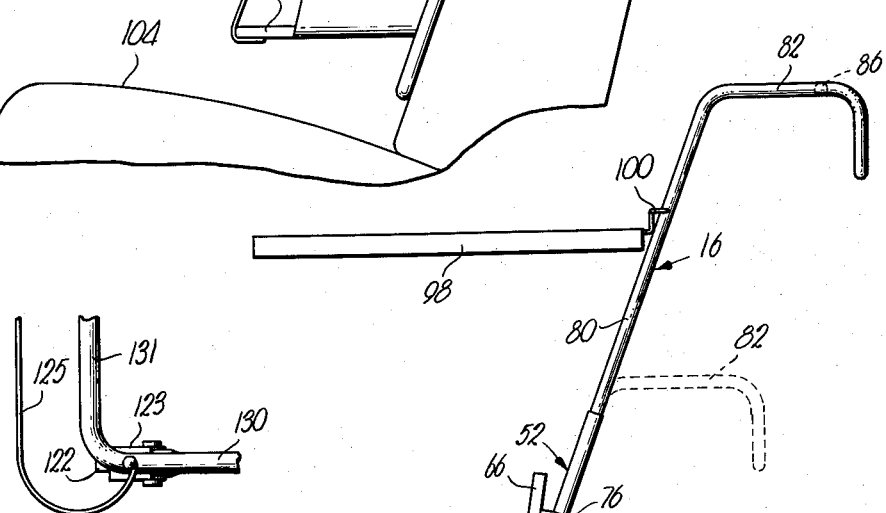
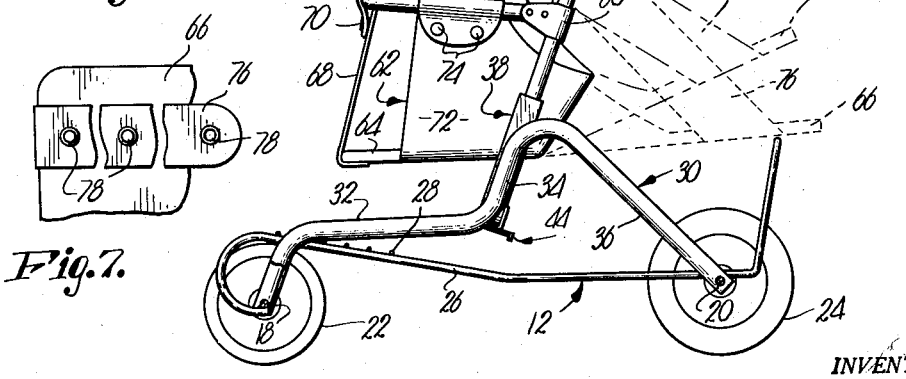
INVENTOR.
Joseph B. Dostal
BY
Hovey, Schmidt, Johnson & Hovey
ATTORNEYS.

Dec. 31, 1963     J. B. DOSTAL     3,116,069
COMBINATION CAR SEAT AND STROLLER

Filed March 19, 1962     2 Sheets-Sheet 2

INVENTOR.
Joseph B. Dostal
BY
Hovey, Schmidt, Johnson & Hovey
ATTORNEYS.

United States Patent Office 3,116,069
Patented Dec. 31, 1963

3,116,069
COMBINATION CAR SEAT AND STROLLER
Joseph B. Dostal, 7334 Belleview, Kansas City, Mo.
Filed Mar. 19, 1962, Ser. No. 180,771
6 Claims. (Cl. 280—30)

This invention relates to improvements in seat structure for supporting a child, and more particularly, relates to a combination car seat and stroller.

It is the primary object of the present invention to provide a combination car seat and stroller including a wheeled base and a seat member releasably mounted on the base for supporting a child, whereby the invention may be utilized as a stroller when the base and seat member are interconnected, and as a car seat when the seat member is removed from the base.

Another object of the present invention is the provision of a combination car seat and stroller of the aforesaid character wherein the seat member includes a frame, a seat portion secured to the frame, and an especially designed, hook-shaped handle mounted on the frame and extending normally upwardly therefrom whereby the frame and seat portion may be suspended from the back of the seat of a car when the handle is hooked over said back, and when the base and seat member are separated.

A yet further aim of this invention is to provide a combination car seat and stroller wherein the handle for the combination is carried by the seat member and is separable from the base with the seat, thereby allowing use of the seat member independently and also allowing for easy storage of the base by virtue of its compact nature.

Another object of the present invention is the provision of channel means rigid to the base and disposed for receiving and embracing the lower end of the frame whereby the frame and thereby the seat portion, may be removably mounted on said base, the assembly and disassembly of the frame from the channel being accomplished with a minimum expenditure of time and effort.

Still another object of the present invention is to provide a novel type of frame for mounting the seat portion on the base, the frame being provided with tubular sections for telescopically receiving the handle, whereby the handle may be disposed in one position with respect to the sections when the device is used as a stroller and in another position when the device is used as a car seat, thus eliminating the need for additional structure for mounting the frame on the seat of the car.

Yet another object of the present invention is the provision of a seat portion having a back thereon provided with adjustable strap means engageable with the sections of the frame whereby the back may be lowered or raised from a substantially horizontal position to a substantially vertical position, thus permitting a child to recline or sit erect while in said seat portion.

Other objects of the present invention will become apparent as the following specification progresses, reference being had to the accompanying drawings, wherein:

FIGURE 1 is a side elevational view of the combination car seat and stroller;

FIG. 3 is a side elevational view of the seat portion showing it separately and in use as a car seat;

FIG. 7 is an enlarged, fragmentary view of the seat portion and illustrating the adjustable strap means thereon for changing the inclination of the back of said seat portion;

FIG. 8 is a fragmentary plan view of a modification of the base and illustrating pivotally mounted casters thereon; and FIG. 9 is a side elevational view of the structure illustrated in FIG. 8.

The combination car seat and stroller hereinafter described, includes a wheeled base, a seat member releasably secured to the base, and a hook-shaped handle mounted on the seat member and extending upwardly therefrom. The seat member includes a frame which is removably received within channel means carried by the base and which mounts a seat portion adapted to support a child above the base. The frame is provided with a pair of tubular sections and the handle is telescopically received within the sections above the seat portion. The seat member, when the frame is removed from the channel means, may be utilized as a car seat by hooking the handle over the back of the seat of a car so that the seat portion and the frame depend from said back. Means is provided for securing the frame to the channel means when the device is used as a stroller, and means is further provided on the handle for interconnecting the same to the sections to prevent relative movement therebetween.

The combination car seat and stroller is broadly denoted by the numeral 10 and includes a mobile base 12, a seat member 14 removably mounted on base 12 and disposed thereabove, and a handle 16 mounted on seat member 14 and extending upwardly from the latter.

Figure 4:
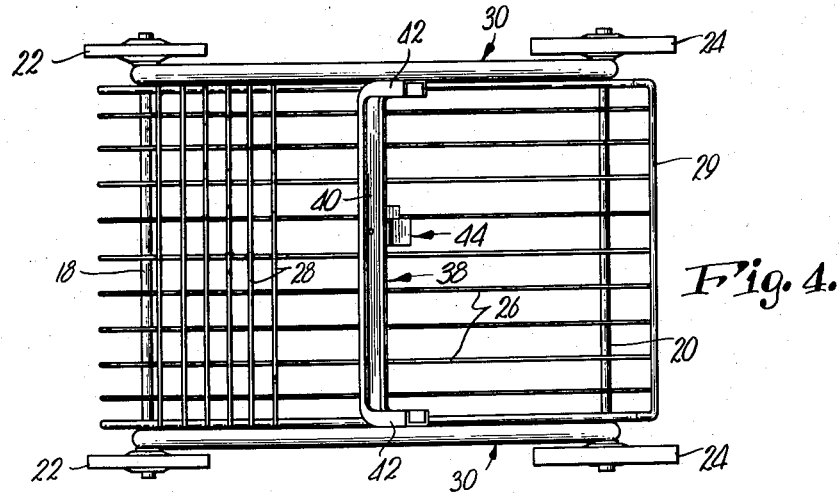
FIG. 4 is a top plan view of the base.

Base 12, as best illustrated in FIG. 4, includes a pair of spaced rods 18 and 20 providing front and rear axles respectively therefor. A pair of front wheels 22 and a pair of rear wheels 24 are rotatably mounted at the ends of rods 18 and 20 respectively as is clear in FIGS. 1 and 4.

A number of longitudinally extending rods 26 span the distance between rods 18 and 20, and a number of transverse rods 28 are connected to rods 26 adjacent to and parallel with rod 18 as is clear in FIG. 4. Rods 26 and 28 form a grid-work at the normally forwardmost end of base 12. It is noted that rods 26 bend slightly upwardly from the center toward the forwardmost end of base 12 as is clear in FIG. 1. Rods 26 also curve downwardly and rearwardly adjacent the zone of interconnection thereof with rod 18 to give a neat and finished appearance to base 12. Rods 26 are bent upwardly and slightly rearwardly with respect to rod 20 as is clear in FIG. 1, and a transverse rod 29 is secured to the upper and rearmost ends of rods 26 for a purpose hereinafter described.

A pair of spaced, longitudinally extending bars 30 span the distance between and are connected to rods 18 and 20. Bars 30 are substantially identical and include a horizontal stretch 32, a substantialy upright stretch 34, and an inclined stretch 36. Stretches 32 and 36 are connected at the outermost ends thereof with rods 18 and 20 respectively, it being clear that stretch 34 is substantially intermediate rods 18 and 20.

Figure 2:
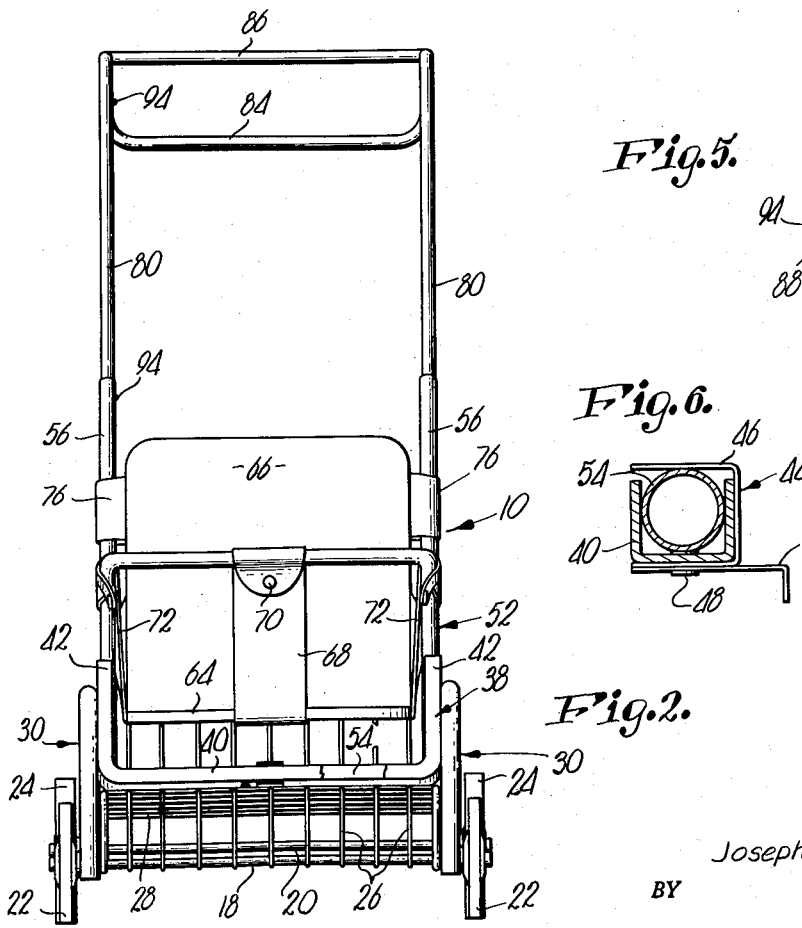
FIG. 2 is a front elevational view thereof.

A U-shaped channel element 38, having a bight 40 and a pair of spaced sides 42 integral with bight 40, is secured to base 12 with sides 42 rigid to corresponding stretches 34 and with bight 40 spanning the distance between bars 30 as is clear in FIGS. 2 and 4. Sides 42 are substantially parallel with the major portion of stretches 34 and extend slightly upwardly from the junctions of stretches 34 and 36. It is noted that stretches 34 and, therefore, sides 42, are inclined slightly toward rod 20.

Figure 6:
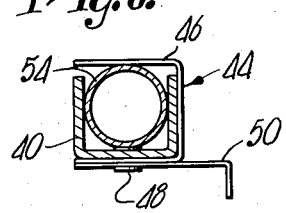
FIG. 6 is an enlarged, cross-sectional view illustrating the means for interconnecting the seat member with the base.

Fastening means 44 is provided on bight 40 intermediate the ends of the latter as is clear in FIGS. 1, 2 and 6. Means 44 include a U-shaped member 46 having a projection thereon extending laterally therefrom and pivotally mounted on the bottom of bight 40 by means of a pin 48. An extension 50 rigid to member 46, permits manual rotation of the latter about the axis of pin 48 so that one side of member 46 is movable into and out of overlying relationship to bight 40 as is clear in FIG. 6.

Seat member 14 includes a generally U-shaped frame 52 having a bight portion 54, and a pair of tubular sections 56. Bight portion 54 and sections 56 are preferably integral with each other and, therefore, bight portion 54 is also tubular. Sections 56 are generally spaced apart by a distance substantially equal to the distance between sides 42 of channel element 38. Also, bight portion 54 is generally of the same length as bight 40 of channel element 38.

A U-shaped, tubular seat support 58 is secured at the ends thereof to sections 56 by brackets 60 so that support 58 projects laterally from sections 56 in the manner illustrated in FIGS. 1 and 2. It is noted that the bight of support 58 is substantially equal in length to bight portion 54 of frame 52. Support 58 is fixed with respect to frame 52 and thus is maintained in a fixed position normally above bight portion 54.

A seat portion 62 comprising a cushioned bottom 64 and a cushioned back 66, is carried by frame 52 and support 58 between sections 56 of the latter. A central strap 68 secured to bottom 64, is looped over the bight of support 58 and held in place by a snap fastener 70. Side straps 72 project outwardly from bottom 64 and also loop around support 58 at the opposed sides thereof. Fasteners 74 secure straps 72 to support 58. Straps 68 and 72 are preferably of a length to space bottom 64 a suitable distance below support 58 to thereby seat a child comfortably on bottom 64 when the child's legs project through the openings between strap 68 and straps 72.

Back 66 is preferably joined integrally with bottom 64 and is free to rotate through a limited arc of approximately 90° with respect to bottom 64. A pair of straps 76 is secured to opposed sides of back 66 and is normally looped about sections 56 and interconnected to dispose back 66 uprightly as is clear in FIG. 1. As shown in FIG. 7, each of the straps 76 is provided with a number of snap fasteners 78 thereon which permit the straps 76 to be adjustable so that back 66 may be positioned in several locations with respect to sections 56. For instance, if it is desired that the child, carried by seat member 14, completely recline, straps 76 are adjusted so that back 66 will be substantially horizontal and will be supported by rod 29. Since back 66 is generally flexible throughout the length thereof, the child is adequately supported in the reclining position.

If it is desired to tilt back 66 rearwardly to a position intermediate the upright and reclined positions, straps 76 are again manipulated until this position is attained.

Handle 16 includes a pair of lengths 80 which may preferably the tubular in construction and of a diameter less than the diameter of sections 56. Lengths 80 are normally telescopically received within the open upper ends of sections 56 as is clear in FIGS. 1 and 2. An L-shaped component 82 is integral with each length 80 at the normally uppermost end thereof and extends normally rearwardly thereof. A tubular rod 84 interconnects the corresponding lowermost and rearmost ends of components 82 in the manner shown in FIG. 2. Components 82 provide a hook for the upper end of handle 16 which may be secured over an object such as the top of the seat of a car for securing seat member 14 thereto. A rod 86 spans the distance between components 82 to strengthen handle 16 and to act as a push bar.

Figure 5:
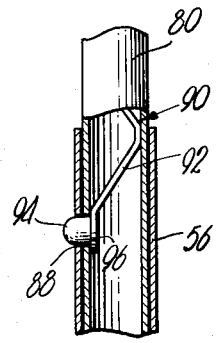
FIG. 5 is an enlarged, fragmentary, side elevational view of the means for interconnecting the handle of the device with the seat member thereof, parts being shown in section to illustrate details of construction.

One of the sections 56 is provided with an opening 88 therein adjacent the uppermost end thereof. The corresponding length 80 carries a pair of spaced fasteners 90 therewithin, each including a spring clip 92 extending longitudinally of length 80 and in engagement therewith, as is clear in FIG. 5. A projection 94 is secured to clip 92 at the opposite end thereof and normally projects through an opening 96 in length 80. Projection 94 is biased outwardly by clip 92 so that when openings 88 and 96 are aligned, projection 94 is thrust outwardly through opening 88 to lock length 80 in the corresponding section 56 and thereby secure handle 16 to seat member 14.

When projection 94 corresponding to the upper fastener 90 is received within opening 88, components 82 are disposed in the dashed line positions illustrated in FIG. 1 so that seat member 14 may suitably be used as a car seat. When projection 94, corresponding to the lower fastener 90 is disposed within opening 88, components 82 are disposed in the full line position of FIG. 1 to provide a handle when device 10 is utilized as a stroller.

A sunshade 98 may be utilized with device 10 and movably secured by mounting means 100 to handle 16 on lengths 80 thereof intermediate the ends of the latter.

A modification of base 12 is illustrated in FIGS. 8 and 9 and includes a pair of bars 130 interconnected at the normally forwardmost ends thereof by a crossbar 131. Front wheels 122 are pivotally mounted on bars 130 adjacent the junctions thereof with bar 131 by swivel means 123. A rod 125 secured to bars 130 in the manner shown in FIG. 8, provides bumper structure for the base when utilizing the swivel wheels 122. By virtue of the construction illustrated in FIGS. 8 and 9, device 10 may be more easily manipulatable than when base 12 is provided with wheels 22.

In use, frame 52 is disposed within channel element 38 when it is desired to utilize device 10 as a stroller. In this case, bottom 64 of seat member 14 is spaced above rods 26 and 28 of base 12, and handle 16 is positioned so that components 82 are in the full line positions of FIG. 1. Thus components 82 and rods 84 and 86 provide means to be grasped by an individual for propelling device 10 forwardly, or for changing the direction of movement of device 10. A child seated on bottom 64, may sit erect, may slightly recline, or may completely recline depending upon the position of back 66 with respect to sections 56. Fastening means 44 is positioned so that one side of member 46 overlies bight 40 and thereby, bight portion 54 in the manner illustrated in FIG. 6 to thereby secure frame 52 to channel element 38.

When it is desired to utilize device 10 as a car seat, fastening means 44 is manipulated to move the side of member 46 out of overlying relationship to bight portion 54. Frame 52 may then be raised out of channel element 38 after handle 16 has been shifted so that lengths 80 move into sections 56. Components 82 thus assume the dashed line positions of FIG. 1.

Handle 16 may then be hooked over the top of the back of a car seat in the manner shown in FIG. 3 so that seat member 14 is disposed with bottom 64 above the horizontal portion 104 of seat 102. Frame 52 and back 66 thus engage the forward upright face of seat 102 to adequately support the back of the child seated on bottom 64.

Device 10 provides structure convertible either to a car seat or to a stroller in a minimum of time and with a minium expenditure of effort. Device 10 is also sturdy, dependable and long-wearing and may be easily stored by virtue of the fact that handle 16 may be telescoped within frame 52 and seat member 14 may be completely removed from base 12.

Having thus described the invention, what is claimed as new and desired to be secured by Letters Patent is:

1. A combination car seat and stroller comprising:
    a wheeled base, said base including a pair of spaced bars each having a substantially upright stretch thereon;
    a seat member including a rigid frame and a seat portion carried by the frame; and
    channel means secured to said base for removably receiving said frame to thereby releasably mount said seat member on said base, said channel means including a U-shaped channel element having a bight spanning the distance between the bars and a pair of sides secured to corresponding stretches and extending upwardly from said base.

2. A combination car seat and stroller comprising:
a wheeled base;
a seat member including a rigid frame and a seat portion carried by the frame; and
channel means secured to said base for removably receiving said frame to thereby releasably mount said seat member on said base, said channel means including a generally U-shaped channel element having a bight disposed adjacent said base and a pair of sides extending upwardly therefrom adjacent the sides of said base, said frame being U-shaped and provided with a bight portion and a pair of tubular sections receivable within the bight and sides respectively, of said channel element.

3. A combination car seat and stroller as set forth in claim 2, wherein said seat portion is mounted on said sections, there being means for mounting the seat member on a car seat including a hook-shaped handle having a pair of spaced, interconnected lengths thereon telescopically received within said sections, there being means on said lengths and coupled with said sections for releasably securing said lengths to said sections.

4. A combination car seat and stroller as set forth in claim 3, wherein is provided means shiftably carried by the bight of said channel element and movable into overlying relationship thereto for releasably securing said frame to said channel element.

5. A combination car seat and stroller comprising:
an elongated base having a wheel and axle assembly at each end thereof and provided with a pair of spaced, longitudinally extending bars thereon, each of said bars having a substantially upright stretch thereon intermediate the ends thereof;
a U-shaped channel element having a bight and a pair of sides, said channel element being disposed on said base with the bight spanning the distance between said bars and the sides secured to and extending upwardly from corresponding stretches;
a U-shaped frame having a bight portion and a pair of spaced, tubular sections integral with said bight portion, said bight portion and said sections being removably received within said bight and said sides of the channel element respectively;
a seat portion carried by said frame, said seat portion having a back provided with strap means thereon adjustably mounted on said sections for securing said back on said frame in any one of a number of fixed positions with respect to said sections; and
a handle for said seat portion, said handle including a pair of lengths telescopically receivable within said sections and extending upwardly therefrom, there being a hook-shaped bight interconnecting the normally uppermost ends of said lengths, whereby said handle may be hooked over a car seat to mount said seat portion thereon when said frame is removed from said channel element.

6. A combination car seat and stroller as set forth in claim 5, wherein is provided means on one of said lengths for releasably securing said handle to said frame, there being means on said bight and movable into overlying relationship thereto for releasably securing said frame to said channel element when said bight portion is received within said bight.

References Cited in the file of this patent
UNITED STATES PATENTS

| | | |
|---|---|---|
| 2,291,640 | Lee | Aug. 4, 1942 |
| 2,481,382 | Bennett | Sept. 6, 1949 |
| 2,509,972 | Gottfried | May 30, 1950 |
| 2,512,995 | Berger | June 27, 1950 |
| 2,574,743 | King | Nov. 13, 1951 |
| 2,593,962 | Barker | Apr. 22, 1952 |
| 2,664,144 | Johnson | Dec. 29, 1953 |
| 2,781,225 | Heideman | Feb. 12, 1957 |
| 2,886,337 | Quisenberry | May 12, 1959 |
| 2,994,557 | King | Aug. 1, 1961 |